(12) United States Patent
Loentgen

(10) Patent No.: US 10,895,333 B2
(45) Date of Patent: Jan. 19, 2021

(54) CONSTRUCTION OF BUOYANT ELEMENTS COMPRISING PACKED MACROSPHERES

(71) Applicant: Acergy France SAS, Suresnes (FR)

(72) Inventor: Vincent Loentgen, Chambry (FR)

(73) Assignee: Acergy France SAS, Suresnes (FR)

( * ) Notice: Subject to any disclaimer, the term of this patent is extended or adjusted under 35 U.S.C. 154(b) by 19 days.

(21) Appl. No.: 16/303,130

(22) PCT Filed: May 19, 2017

(86) PCT No.: PCT/IB2017/000821
§ 371 (c)(1),
(2) Date: Nov. 19, 2018

(87) PCT Pub. No.: WO2017/199102
PCT Pub. Date: Nov. 23, 2017

(65) Prior Publication Data
US 2019/0271411 A1      Sep. 5, 2019

(30) Foreign Application Priority Data
May 20, 2016   (GB) .................................... 1608930.2

(51) Int. Cl.
| | |
|---|---|
| *F16L 1/16* | (2006.01) |
| *B29D 23/00* | (2006.01) |
| *B63B 22/00* | (2006.01) |
| *B29K 105/04* | (2006.01) |
| *B29K 105/00* | (2006.01) |

(52) U.S. Cl.
CPC ............ *F16L 1/163* (2013.01); *B29D 23/001* (2013.01); *B63B 22/00* (2013.01); *B29K 2105/04* (2013.01); *B29K 2105/251* (2013.01)

(58) Field of Classification Search
CPC .... F16L 1/163; B29D 23/001; B29K 2105/04
See application file for complete search history.

(56) References Cited

U.S. PATENT DOCUMENTS

| | | | |
|---|---|---|---|
| 3,703,012 A * | 11/1972 | Mast .......................... | B63B 3/13 441/136 |
| 3,773,475 A * | 11/1973 | Madden, Jr. .............. | B63B 3/13 428/558 |

(Continued)

FOREIGN PATENT DOCUMENTS

| | | |
|---|---|---|
| EP | 0 022 581 A1 | 1/1981 |
| EP | 2 845 792 | 3/2015 |

(Continued)

*Primary Examiner* — S. Joseph Morano
*Assistant Examiner* — Jovon E Hayes
(74) *Attorney, Agent, or Firm* — Levy & Grandinetti

(57) ABSTRACT

A method of filling a chamber with buoyant macrospheres places a mass of the spheres into a mould cavity. In the mould cavity, packing of the spheres is optimized to form an optimally-packed mass, followed by fixing the spheres in the optimally-packed mass to form a block. The block is then transferred from the mould cavity into the chamber while the spheres of the block remain fixed in the optimally-packed mass. This method enables the production of a buoyant element comprising an envelope defining an internal chamber that contains a mass of buoyant macrospheres each with an external diameter of at least 5 mm, packed with a packing factor of at least 50%.

25 Claims, 11 Drawing Sheets

(56) References Cited

U.S. PATENT DOCUMENTS

| | | | | | |
|---|---|---|---|---|---|
| 4,040,165 | A | * | 8/1977 | Miessler | B29C 70/025 |
| | | | | | 29/458 |
| 2013/0251957 | A1 | * | 9/2013 | Watkins | B09C 1/00 |
| | | | | | 428/188 |
| 2018/0022422 | A1 | * | 1/2018 | Bregonzio | C23C 18/1653 |
| | | | | | 441/133 |
| 2019/0271411 | A1 | * | 9/2019 | Loentgen | B63B 22/00 |

FOREIGN PATENT DOCUMENTS

| | | | | |
|---|---|---|---|---|
| GB | 2517511 | | 2/2015 | |
| JP | 2007-126059 | | 5/2007 | |
| JP | 2007-126060 | | 5/2007 | |
| JP | 4983003 | | 7/2012 | |
| WO | WO 9/04865 | | 3/1994 | |
| WO | WO 99/44881 | | 9/1999 | |
| WO | WO-9944881 A1 | * | 9/1999 | ............. B63B 3/13 |
| WO | WO 03/074598 | | 9/2003 | |
| WO | WO 2005/025830 | | 3/2005 | |
| WO | WO-2005025830 A1 | * | 3/2005 | ............ F16L 59/143 |
| WO | WO 2014/145027 | | 9/2014 | |

* cited by examiner

CONSTRUCTION OF BUOYANT ELEMENTS COMPRISING PACKED MACROSPHERES

This invention relates to the provision of buoyancy in subsea applications, using packed macrospheres to produce buoyancy modules or other buoyant elements.

The art of subsea engineering requires long-lasting buoyant elements that will resist being crushed under hydrostatic pressure in use. For many years, this need has been met by syntactic foams having a binary composite structure that comprises hollow rigid microspheres, micro-balloons or beads embedded in a rigid matrix. For example, buoyant elements of syntactic foam may be attached to or incorporated into a structure or apparatus used in the subsea oil and gas industry, such as a flowline, a riser, a pipeline bundle or an ROV.

Usually, the microspheres used in syntactic foams are of glass or ceramics, with a typical outer diameter of substantially less than 1 mm, say 10 μm to 200 μm. The matrix of such foams is usually of epoxy resin, polyester or wax. The microspheres have a specific gravity that is low enough and a volume fraction that is high enough, in bulk, to confer substantial positive buoyancy on a body of syntactic foam into which they are incorporated.

It is also known to use macrospheres in syntactic foams, those macrospheres having a typical outer diameter in a range from about 5 mm to about 50 mm but usually greater than 10 mm. Macrospheres are commonly made of glass, glass fibre or ceramics, like microspheres. In principle, however, metals and polymers such as epoxy resins may also be used to make macrospheres.

Syntactic foam is just one example of the use of a granular mass of buoyant spheres or beads to provide buoyancy. For example, buoyant spheres can be supported in a liquid, providing what is known in the art as 'liquid buoyancy', or surrounded by a gas. Buoyant spheres can be placed in a rigid buoyancy tank or in a bag.

Buoyant spheres typically have a rigid spherical wall or shell surrounding a hollow interior that contains a gas such as air or nitrogen. It is also possible for the interior of a buoyant sphere to contain a solid material that is light enough for the product to have positive buoyancy in seawater. For example, some macrospheres comprise a spherical core of lightweight polymer foam, around which a rigid shell of epoxy resin is applied as a coating. The shell of a macrosphere may include reinforcing elements such as glass fibres.

It is not essential that buoyant spheres or beads are perfectly spherical. However, substantial sphericity is an advantage to maximise resistance to crushing, to minimise material usage and to simplify packing.

By way of example, buoyant spheres of glass are sold in bulk by 3M™ as 'Glass Bubbles', in various grades. Being of glass, these spheres have the benefit of being virtually insoluble in seawater.

The exemplary dimensions of microspheres and macrospheres set out above are given for ease of understanding and are not intended to be limiting. In the context of the invention, the main distinction between microspheres and macrospheres is that the packing density or packing factor is more significant for macrospheres than for microspheres.

Specifically, macrospheres in a bulk mass will pack or nest against each other in various arrays, so that their positions tend to be determined to a substantial extent by the positions of adjoining macrospheres or arrays in the mass. This affects the packing factor, expressed as a percentage of the internal volume of an envelope or container that is occupied by macrospheres, which will depend upon how tightly the macrospheres are packed together. Conversely, microspheres are so fine-grained or even powdery in bulk that they become suspended in the bulk matrix. This means that their positions in the matrix are less dependent upon the positions of neighbouring microspheres.

In syntactic foams comprising a mixture of microspheres and macrospheres, the macrospheres pack against each other to leave interstitial voids between them; the microspheres and the matrix together fill those voids. However, it is possible for a syntactic foam to comprise only macrospheres embedded in a matrix that fills the interstitial voids but does not contain any microspheres.

It is also possible for a buoyant element to comprise macrospheres with substantially no matrix or other materials in the interstitial voids between them. Eliminating the matrix in this way may be desirable to reduce cost and to obviate creep or ageing of the matrix with time and subsea use. Creep that reduces the volume of the matrix is undesirable not only because it reduces buoyancy but also because it causes an unpredictable drift of buoyancy over time spent underwater.

Where there is no matrix, the macrospheres are held together as a granular bulk material in an external envelope that can be fastened to, or built into, a subsea structure or apparatus. The envelope preferably holds the macrospheres in a tightly-packed configuration to maximise the packing factor. For example, the envelope may apply inward compression to the mass of macrospheres to hold them together.

An envelope that contains macrospheres could be rigid and sealed to exclude seawater from its interior, so that buoyant upthrust will arise from displacement of seawater corresponding to the external volume of the envelope. In that case, the function of the packed macrospheres is to support the rigid envelope that surrounds them, and to preserve useful secondary buoyancy in the event that the envelope is ever flooded.

Preferably, however, the envelope has openings, holes, perforations or porosity so as to admit seawater into its interior, flooding the voids between the macrospheres. This means that the envelope does not need to resist hydrostatic pressure and so can be either rigid or flexible. As an example of this approach, JP 4983003 discloses a rigid tank containing macrospheres and makes provision for seawater to circulate around the macrospheres in the tank.

Where the interior of an envelope surrounding a mass of macrospheres is flooded, buoyant upthrust will arise from displacement of seawater corresponding to the aggregate external volume of the macrospheres within the envelope. Upthrust forces are transferred from the macrospheres to the surrounding envelope and from there to the subsea structure or apparatus to which the envelope is attached, or into which the envelope is incorporated.

The packing factor for macrospheres is important because it determines how many macrospheres, each of a particular external volume, can be incorporated within an envelope having a given internal volume. This therefore determines the aggregate buoyancy, or at least the secondary buoyancy, of a buoyant element comprising an envelope of a given size. Dense packing of macrospheres also improves the stability, and hence the load-bearing ability, of a mass of such macrospheres, as each macrosphere is held against movement by virtue of simultaneous contact with multiple other macrospheres in a three-dimensional array.

FIGS. 1 to 4 illustrate various lattice systems, being examples of different ways in which substantially identical macrospheres 10 can pack together in a mass. The macrospheres are drawn as identical and may have substantially homogeneous size or may be of different sizes. Other lattice systems are possible in a packed mass, especially if the macrospheres in the mass vary in size. It will be noted that in the absence of an interstitial matrix, neighbouring macrospheres can come into direct contact with each other as shown.

FIG. 1 shows a primitive cubic array 12 comprising eight macrospheres 10. It will be apparent that the macrospheres 10 surround a large central void. If flooded by seawater in use, such large interstitial voids will significantly reduce the overall buoyancy of a given mass of macrospheres 10 packed loosely in this way. It will also be apparent that successive layers of the macrospheres 10 can slide past each other readily, which reduces the stability and hence the load-bearing ability of the mass.

In the body-centred cubic array 14 shown in FIG. 2, a central macrosphere 10 partially fills the void between eight other macrospheres 10 that are in a slightly enlarged cubic array. It will be apparent that these nine macrospheres 10 fit into a cuboidal volume only slightly larger than that of the primitive cubic array of FIG. 1. The packing factor is correspondingly higher, which increases the buoyancy of a given volume of macrospheres packed in this way. Also, successive layers of the macrospheres interlock to increase the stability of the mass.

The face-centred cubic array 16 shown in FIG. 3 and the hexagonal close-packed array 18 shown in FIG. 4 further increase the packing factor and further improve the stability of a mass of macrospheres 10 packed in those ways.

Filling a volume with buoyant spheres can be achieved simply by pouring a mass of such spheres into that volume. For example, WO 94/04865 shows how buoyant spheres may be poured into a rigid housing. However, as the packing factor is not optimised, buoyancy is lost because large voids may remain between many of the spheres. This is also a problem for the aforementioned JP 4983003.

It will be apparent that the number of buoyancy-providing macrospheres that can be poured into a rigid and complex envelope is limited by the ways in which the macrospheres will pack together. It can be demonstrated that the volume occupied by a mass of substantially identical macrospheres will range from 34% to 74% of the internal volume of the envelope. The lower end of that range corresponds to the most loosely-packed diamond cubic configuration, which is not shown in FIGS. 1 to 4. The upper end of that range corresponds to the most closely-packed configurations shown in FIGS. 3 and 4.

In practice, the internal configuration of a poured mass of macrospheres is not homogenous or consistent throughout the mass. There will be a mixture of different lattice systems within such a mass, including many in less stable arrangements such as primitive cubic arrays.

Those skilled in the art know that shaking or vibrating a rigid envelope filled with a poured mass of macrospheres will settle the macrospheres into more stable arrays under the influence of gravity. This rearrangement of macrospheres helps to increase the packing factor. They also know that additional macrospheres should be poured into the envelope during vibration to compensate for shrinkage of the mass as the packing factor increases. For example, vibration of a poured mass may increase the packing factor from around the 52% that characterises a wholly primitive-cubic configuration shown in FIG. 1 toward the 68% that characterises a wholly body-centered cubic configuration shown in FIG. 2. In practice, an overall packing factor of 60%±5% is typically achievable by vibrating an envelope that contains a poured mass of macrospheres.

Unfortunately, it is not always possible to vibrate an envelope effectively due to its size. For example, the envelope of a buoyant element may be defined by a large structure such as a tubular buoyancy member for a bundled flowline, which may be greater than 100 m in length. Consequently, pouring a mass of macrospheres into such an envelope will result in a low packing factor and correspondingly low aggregate buoyancy for a given size of envelope. This requires the structure to be made larger to achieve a desired degree of buoyancy, which makes an already large structure considerably more costly and more challenging to handle.

Another problem is that where there is no matrix or other binding material in the interstitial voids between packed macrospheres, the macrospheres are free to reorganize themselves after vibration has ceased. Consequently, when the envelope of a buoyant element is moved after being vibrated, the packing factor of the macrospheres within is likely to deteriorate. This is particularly problematic if the envelope is flexible.

A low packing factor is a significant problem where the unoccupied space within the envelope will be filled by seawater, as this increases the equivalent density of the buoyant element and hence reduces its buoyancy. Consequently, the envelope must be made larger than is ideal if it is to hold enough macrospheres to provide a desired degree of buoyancy.

Where buoyant spheres are held inside a rigid watertight envelope as disclosed in WO 94/04865, a low packing factor arising from large interstitial voids is less damaging to buoyancy because the voids will contain air or another gas, typically nitrogen. However, a rigid envelope containing gas cannot withstand high hydrostatic pressure, especially if the spheres within the envelope are not optimally packed. Strengthening the envelope to withstand such pressure would increase its weight and hence reduce the aggregate buoyancy of a buoyant element comprising such an envelope.

In JP 4826215, the envelope is a rubber bag. Here, again, filling is not optimal and the bag can collapse under high hydrostatic pressure. In the alternative of liquid buoyancy as disclosed in GB 2517511, buoyant spheres are submerged in a liquid. Again, optimal packing is required to maximise buoyancy because the liquid is denser than the spheres: the surrounding envelope should contain as many of the spheres and as little of the liquid as possible.

U.S. Pat. No. 3,703,012 teaches that the shape of the envelope of a buoyant element may be designed for optimum packing with buoyant spheres. However, such idealised envelope shapes cannot necessarily be used in practice. Nor is such a solution useful for flexible envelopes such as bags.

U.S. Pat. No. 3,773,475 describes filling and bonding of spheres inside a rigid envelope to produce a structural member. The spheres are individually pressurised internally and are heated to expand, distort into non-spherical shapes and bond together within the envelope. This solution is not practical where the envelope is too large to be heated or is of a material that would be damaged if it was heated to a temperature sufficient to soften the spheres.

WO 2014/145027 teaches preparing a syntactic wax or oil by mixing microspheres into a matrix of wax or oil. The matrix is kept at a temperature that is high enough to be in a liquid or pliable state for insertion into a chamber such as a hollow structural member. The wax or oil is then allowed to cool to ambient temperature so that it solidifies to create a buoyant element of a solid syntactic material. However, there is no teaching of optimising packing of buoyant macrospheres; as noted above, microspheres suspended in a matrix do not pack together in any meaningful way. Also, the mechanical strength of the solid syntactic material may be low, and the matrix is prone to creep and degradation with use and time.

WO 2003/074598 relates to a method of manufacturing low-density syntactic foam containing microspheres. A mixture of microspheres and liquid phase binder are placed in a mould. The microspheres are naturally buoyant in the binder and so float to the upper surface of the mould and self-pack in a layer. Excess liquid phase binder is then drained to leave a packed layer of microspheres that subsequently hardens into a close packed syntactic foam layer. As already noted, microspheres that are suspended in a matrix do not pack together optimally.

JP 2007126060 discloses a flexible buoy for use on mooring cables. The buoy comprises a flexible outer shell that houses a mass of spherical buoyant bodies. A through-hole in the outer shell allows seawater to flood the buoy in use. This equalises hydrostatic pressure and so allows the outer shell to be kept thin. There is no provision to optimise the packing density of the spherical buoyant bodies.

EP 2845792 describes a buoyancy module for use in subsea applications. The buoyancy module contains a buoyant fluid that comprises a base fluid, a plurality of microspheres, and an activator that acts as a setting agent for the buoyant fluid.

US 2013/251957 teaches a buoyancy module that includes hollow cylindrical tubes surrounded by a mixture of macrospheres and syntactic foam.

Against this background, the invention provides a method of filling a chamber with buoyant spheres, such as macrospheres having an external diameter of at least 5 mm. The method comprises: placing a mass of the spheres into a mould cavity; in the mould cavity, optimising packing of the spheres to form an optimally-packed mass and then fixing the spheres in the optimally-packed mass to form a block; and transferring the block from the mould cavity into the chamber while the spheres of the block remain fixed in the optimally-packed mass.

A block may be stored before being placed into the chamber. Preferably the chamber is substantially filled with one or more of the blocks.

The spheres are preferably fixed by holding them together in the mould cavity with a matrix material that may embed the spheres. The matrix material may be introduced into the mould cavity in a liquid phase and then transformed in the mould cavity into a solid phase, for example by freezing the matrix material. More generally, optimising packing of the spheres may take place at a first temperature and fixing the spheres may take place at a second temperature lower than the first temperature. Preferably, optimising packing of the spheres begins or takes place before introducing the matrix material into the mould cavity.

The spheres of the block may be unfixed after the block is placed in the chamber. This may be achieved by removing a matrix material of the block from the chamber, for example by liquefying the matrix material and draining the liquefied matrix material from the chamber. Conversely, voids in the chamber may be flooded in use to surround the spheres with water.

The unfixed spheres may be constrained to maintain substantially optimal packing of the spheres in the chamber, for example with at least one barrier placed in or against the block.

The chamber may be defined by a flexible or rigid envelope. Preferably the mould cavity is shaped to match the chamber. For example, the mould cavity may be tubular to produce a cylindrical block and the chamber may be defined by the interior of a pipe into which one or more of those blocks are inserted longitudinally through an open end.

The spheres may be packed around or beside an insert in the mould cavity, and may be constrained with at least one barrier supported by the insert.

The inventive concept embraces a buoyant element comprising an envelope defining an internal chamber that contains a mass of buoyant macrospheres each with an external diameter of at least 5 mm, packed with a packing factor of at least 50%.

The macrospheres are suitably substantially homogeneous in size throughout the mass. Voids between the macrospheres in the mass are preferably in fluid communication with one or more openings that penetrate the envelope, which may be flexible or rigid and could be defined by a pipe.

At least one barrier may subdivide the chamber and constrain movement of the macrospheres within the chamber. The macrospheres may be packed around or beside at least one insert, which may conveniently support at least one such barrier.

Thus, preferred embodiments of the invention solve the problems of the prior art by exploiting a phase transition of a matrix material, such as water, from liquid to solid. Specifically, macrospheres are poured into a mould cavity whose shape is preferably adapted to the desired shape of a buoyancy chamber, such as may be defined by an envelope of a buoyancy module. The packing factor of the mass of macrospheres is increased, typically by vibrating the mass. Next, the mould is closed and water is introduced into the mould cavity and frozen solid to mould or cast a block.

The resulting block of ice containing packed macrospheres is demoulded and optionally stored in a cold room or refrigerated container, which may be moved to another location. The block is then installed in a receiving chamber that may be defined by an envelope such as a tube or pipe into which the block is pushed, before the ice is melted to revert to liquid water that flows out of the envelope. This leaves the macrospheres in the receiving chamber, retaining the increased packing factor achieved in the mould cavity without necessarily having any ice or other matrix material left between them.

The invention is especially suitable for use with a bundled flowline comprising a hollow polymer or composite buoyancy pipe filled with buoyant spheres. The pipe may have holes to allow melt water or other liquefied matrix materials such as molten hydrocarbons to flow out of the pipe.

In summary, embodiments of the invention may involve firstly optimising packing of buoyant spheres or beads in a rigid container or chamber, for example by vibration. The container may already contain a liquid or a liquid may be introduced into the container after vibration. Then the phase of the liquid is changed to a solid to fix the buoyant spheres in an optimally-packed arrangement in which the container is preferably more than 60% or even more than 70% full of spheres. A refilling circuit may communicate with the container to continue adding spheres to the container as the packing factor increases. Vibration may continue while the liquid is being solidified.

The resulting solid block is transferred directly or indirectly from the container into a final container, chamber or envelope, for example via a rigid support. The envelope can be rigid or flexible, and preferably allows water to enter voids between the buoyant spheres in use. Such voids may be created by causing or allowing the solidified liquid to revert to the liquid phase by melting in the final container or envelope, whereupon the liquid can drain away.

Thus, these embodiments provide a method for optimising buoyancy, comprising: filling a container with buoyant spheres, preferably macrospheres; filling the container with a fluid at a first temperature; packing the spheres and adding as many spheres as required for optimum packing; closing the container; applying a second temperature, lower than the first temperature, so that the fluid solidifies; and at this second temperature, opening the container and transferring solid blocks containing the spheres to be placed into a final container, such as an envelope of a buoyancy module. The envelope may be flexible, such as a bag, or relatively rigid, such as a pipe.

The first temperature may be ambient temperature, for example 5° C. to 30° C., if the filling fluid is water. Alternatively, the first temperature may be a higher temperature, for example greater than 35° C., if the filling fluid is a molten hydrocarbon such as a wax, paraffin or vegetal oil. The second temperature may be below 0° C. if the filling fluid is water or may be below, say, 20° C. if the filling fluid is a hydrocarbon such as wax, paraffin or a vegetal oil.

By way of background to the invention, reference has already been made to FIGS. 1 to 4 of the accompanying drawings, in which.

Figure 5:
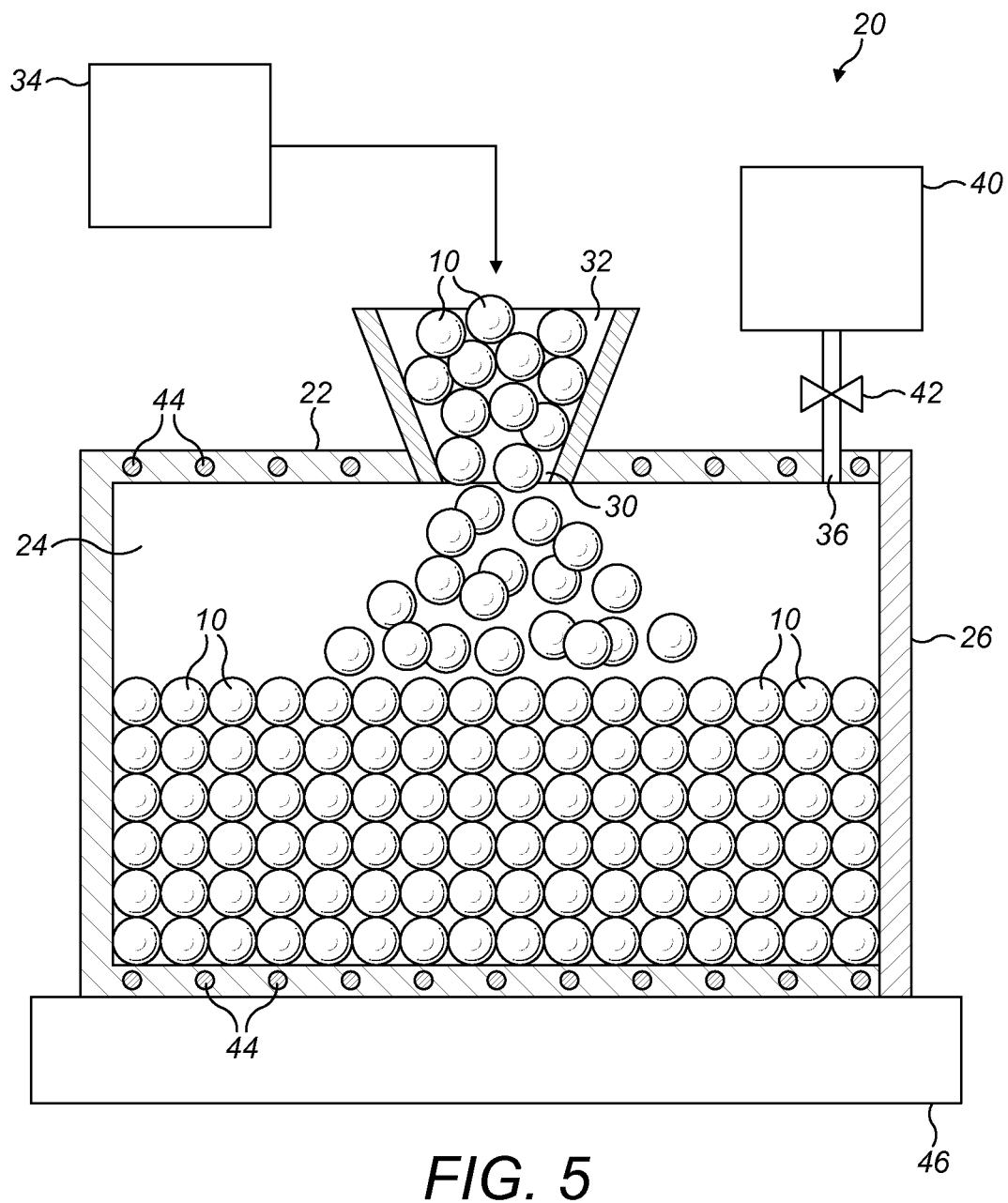
Figure 6:
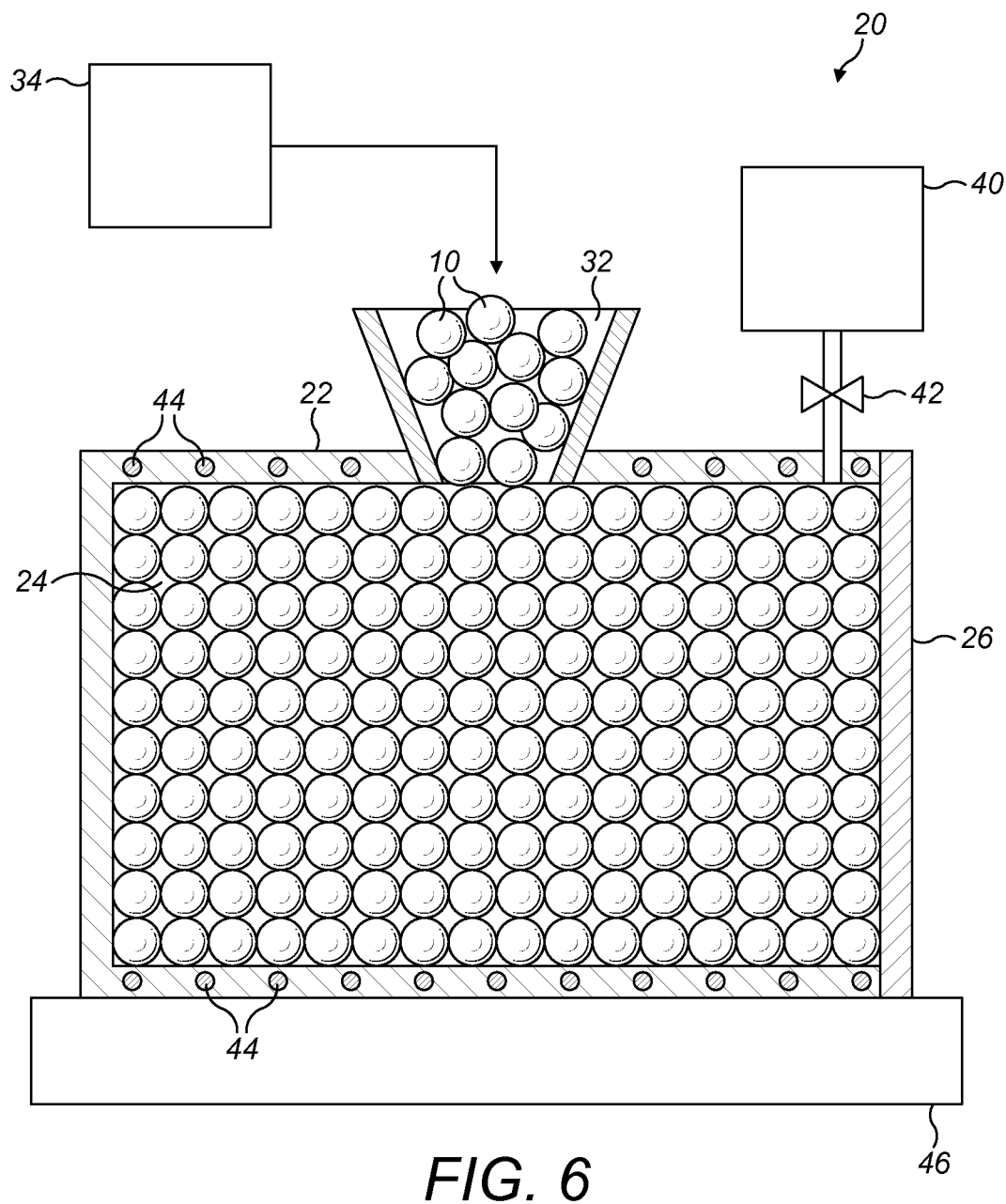
Figure 7:
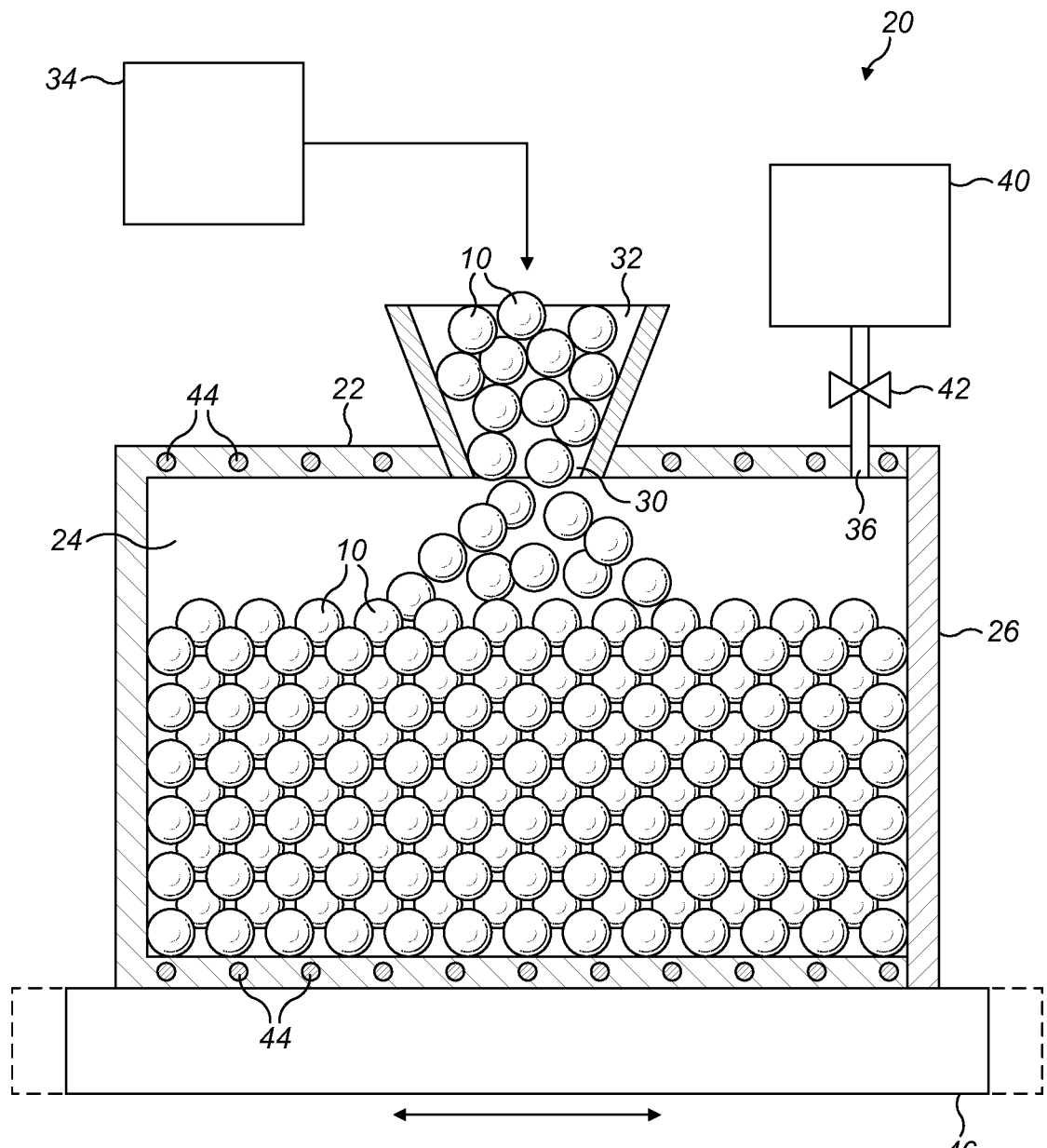
Figure 8:
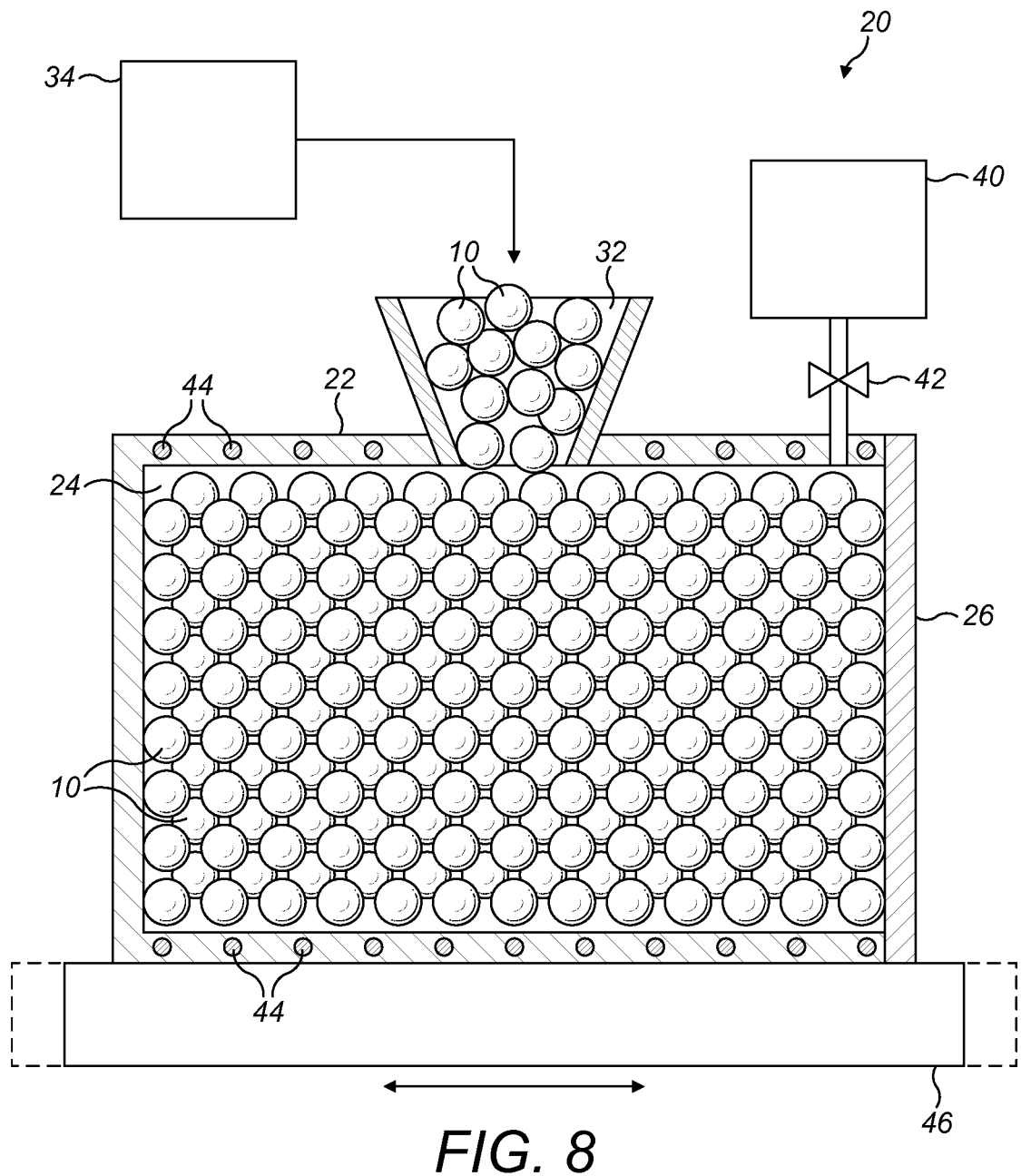
Figure 9:
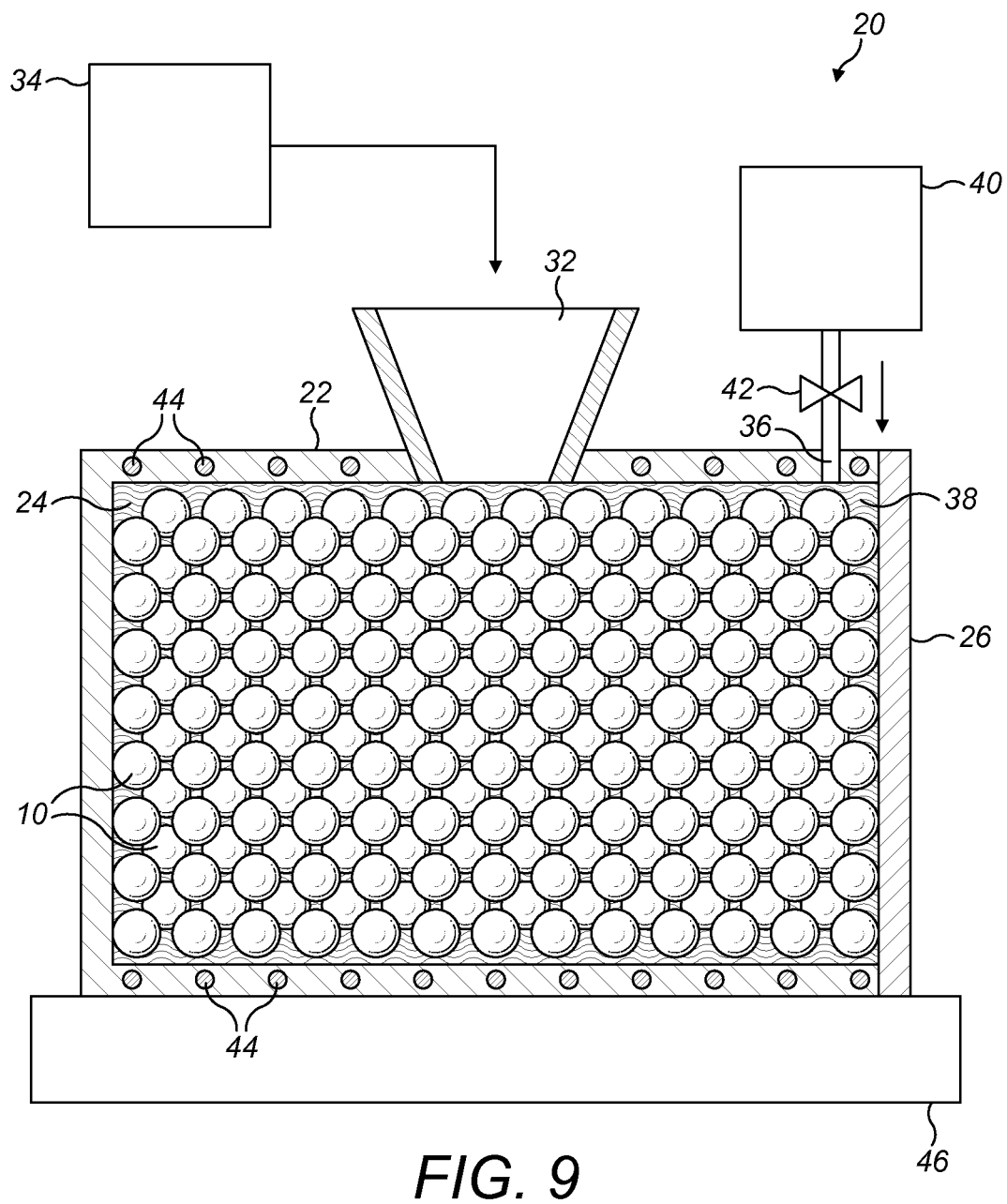
Figure 10:
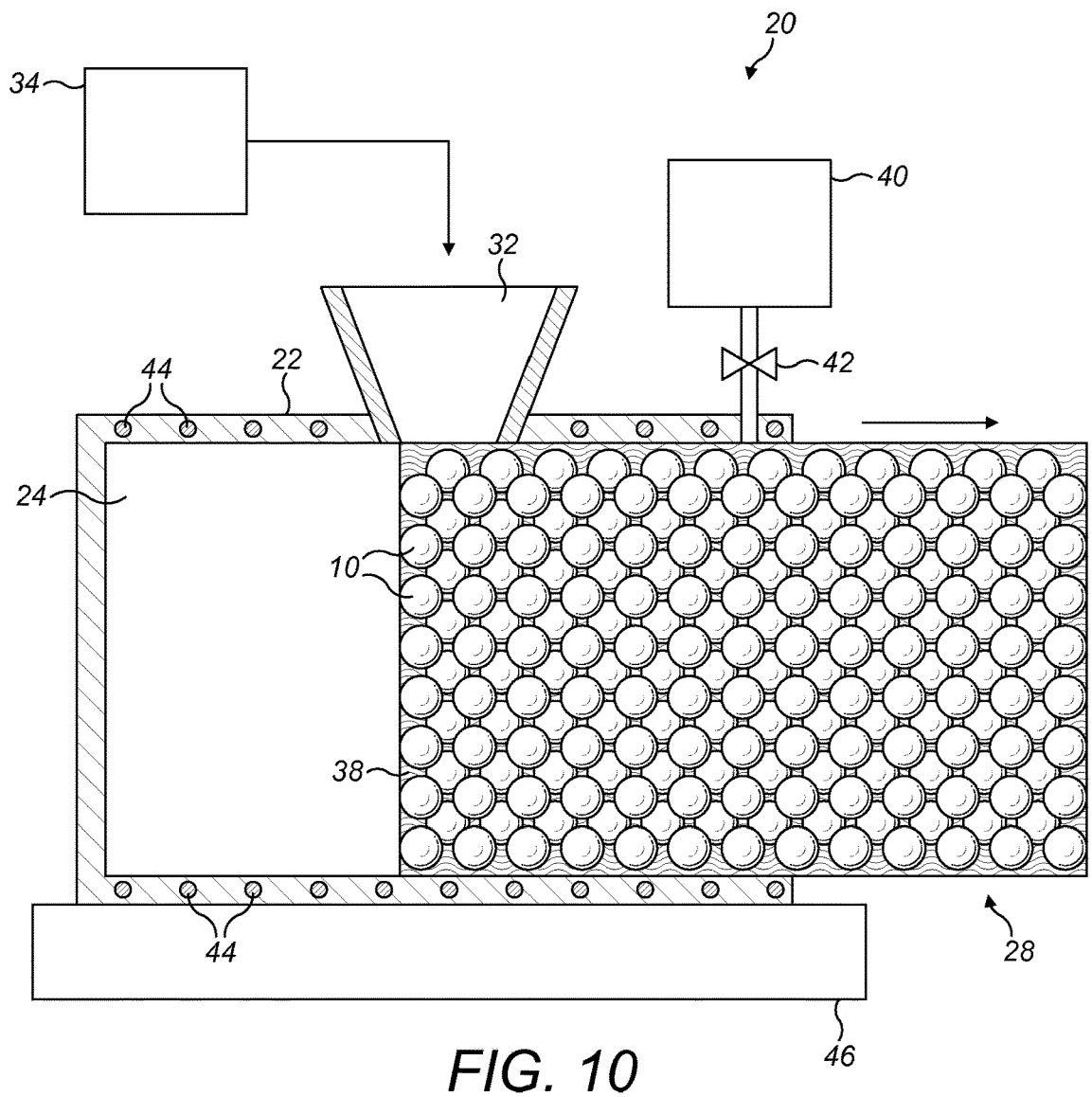
Figure 11:
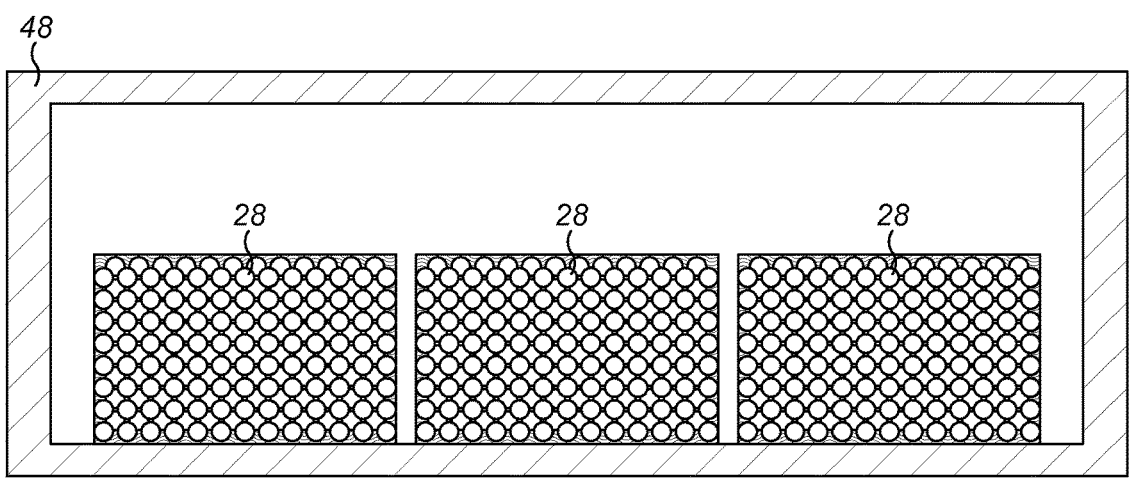
Figure 12:
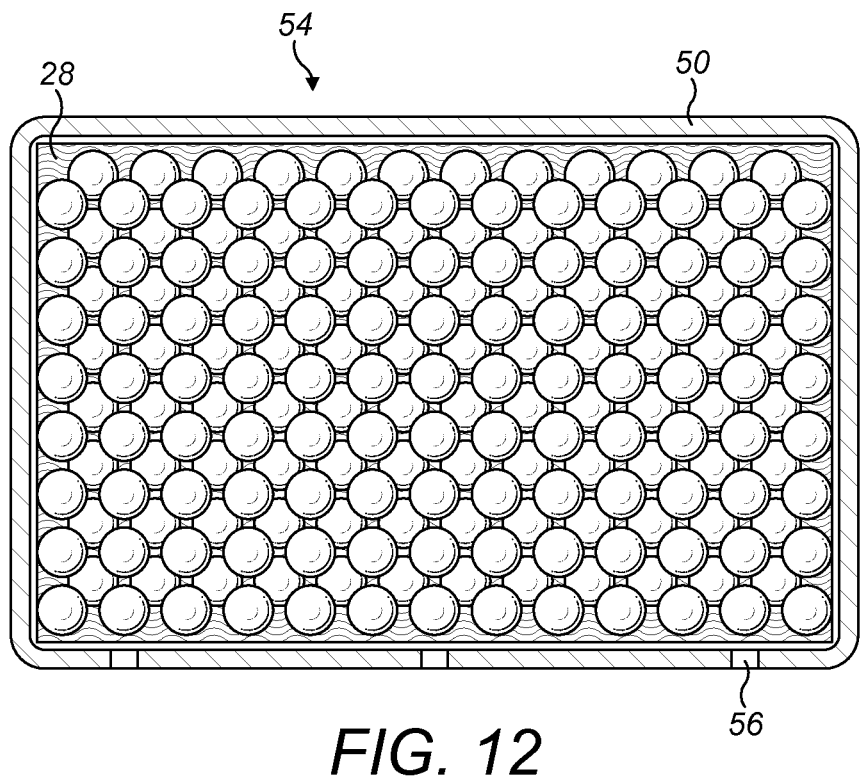
Figure 13:
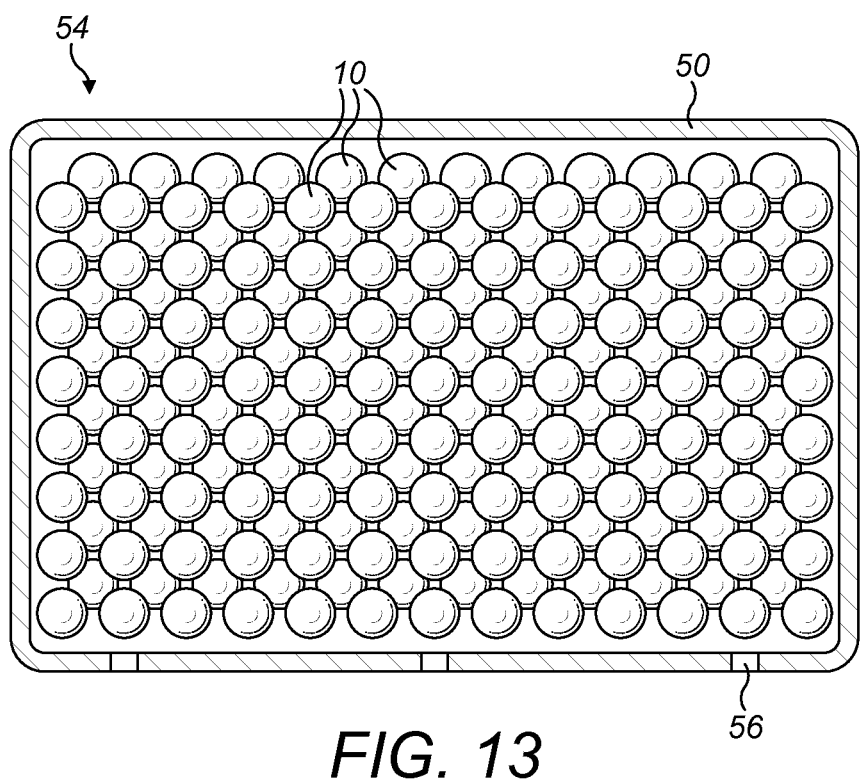
Figure 14:
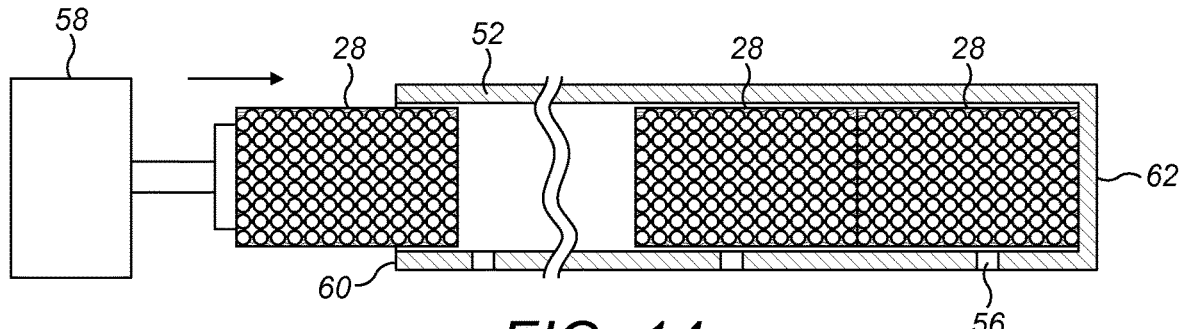
Figure 15:
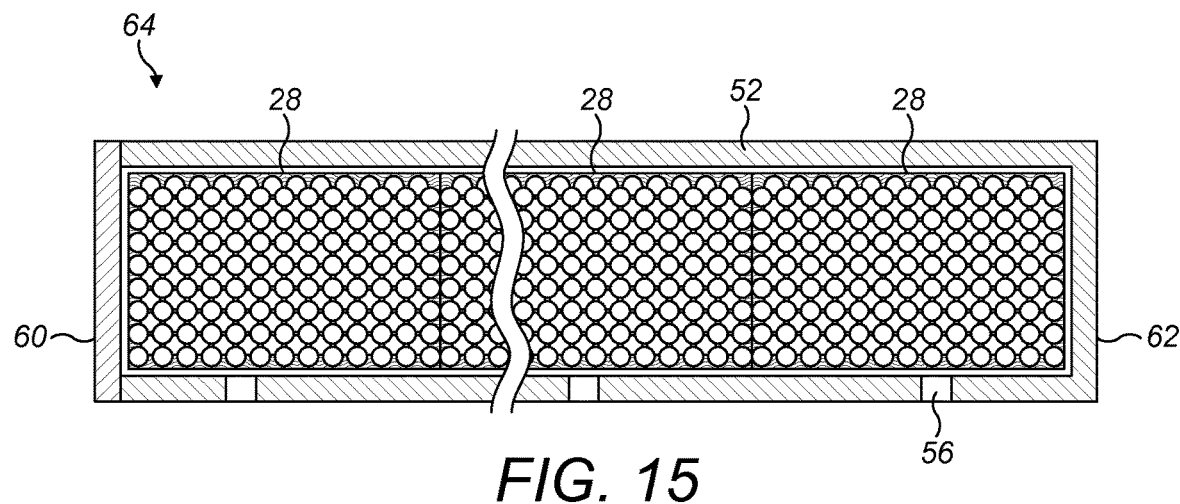
Figure 16:
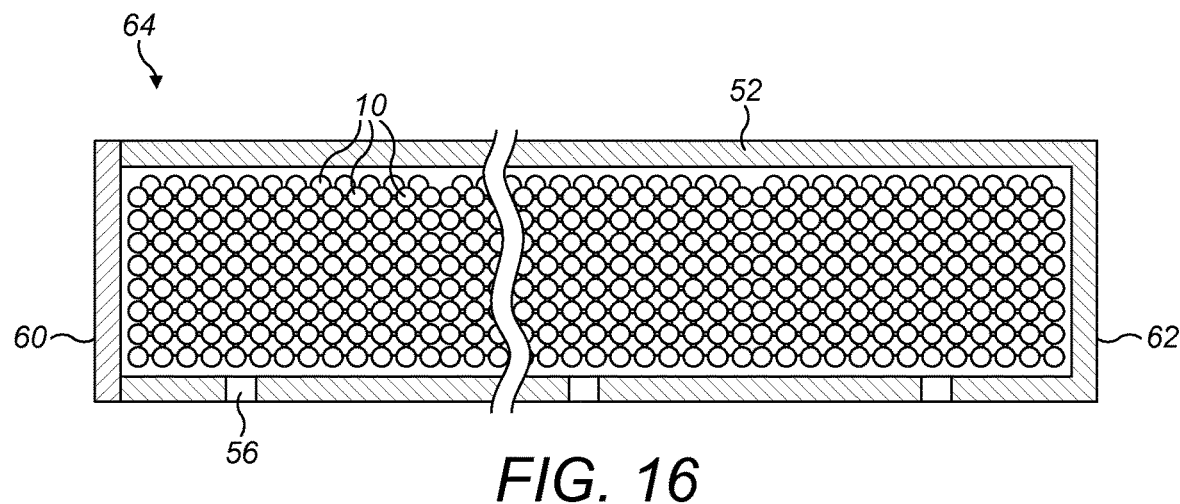
Figure 17:
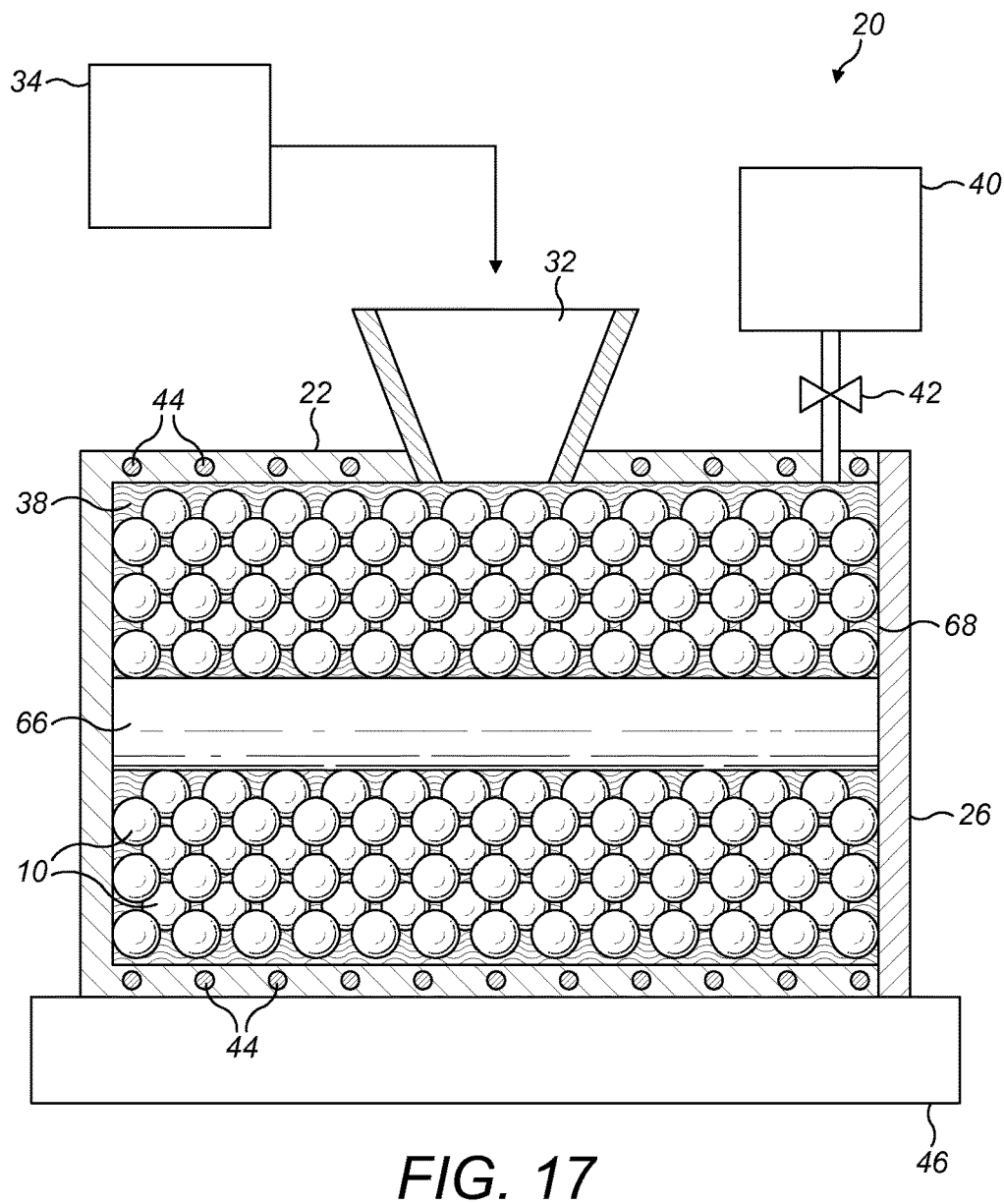
Figure 18:
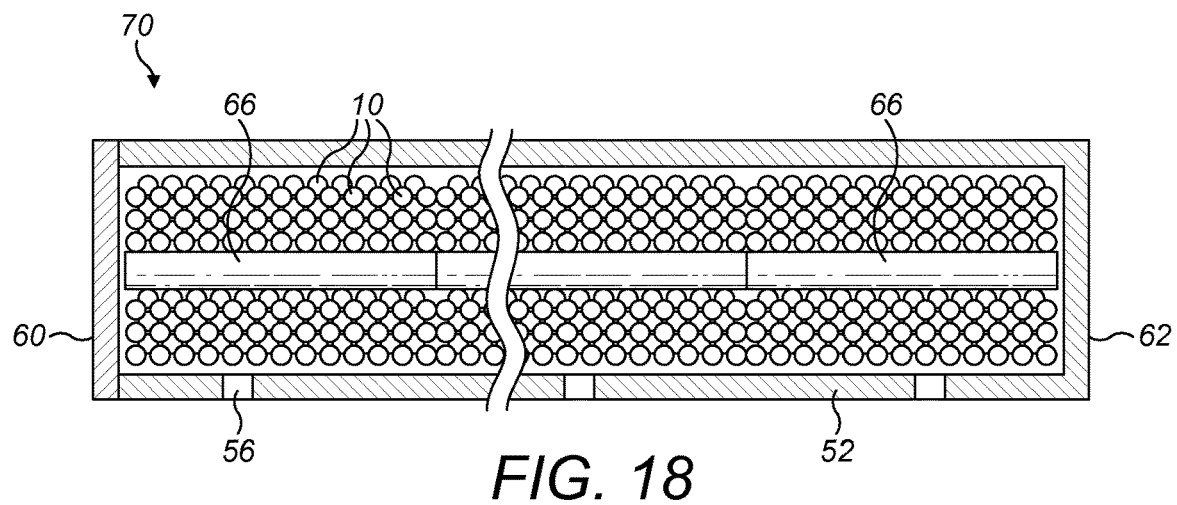
Figure 19:
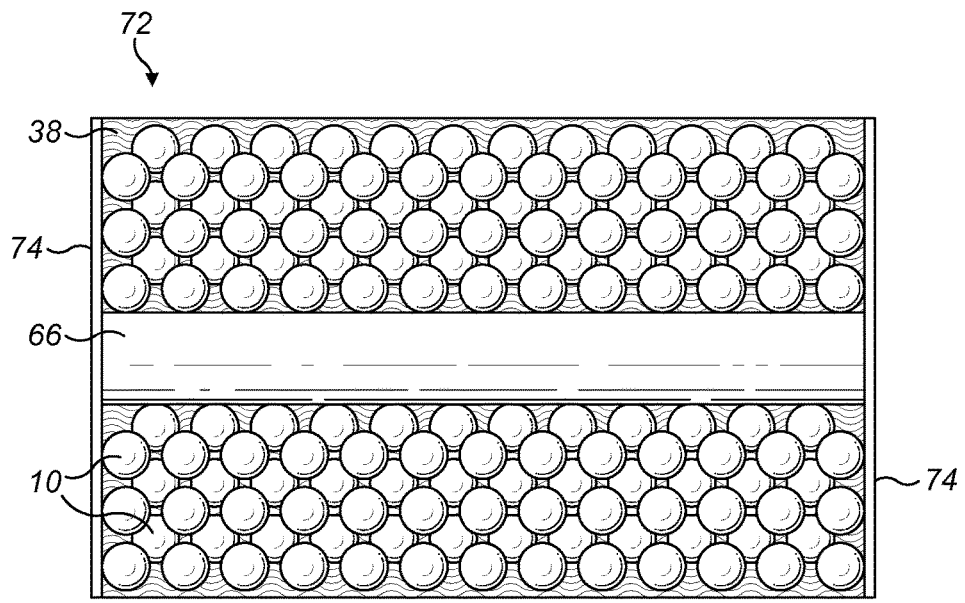
Figure 20:
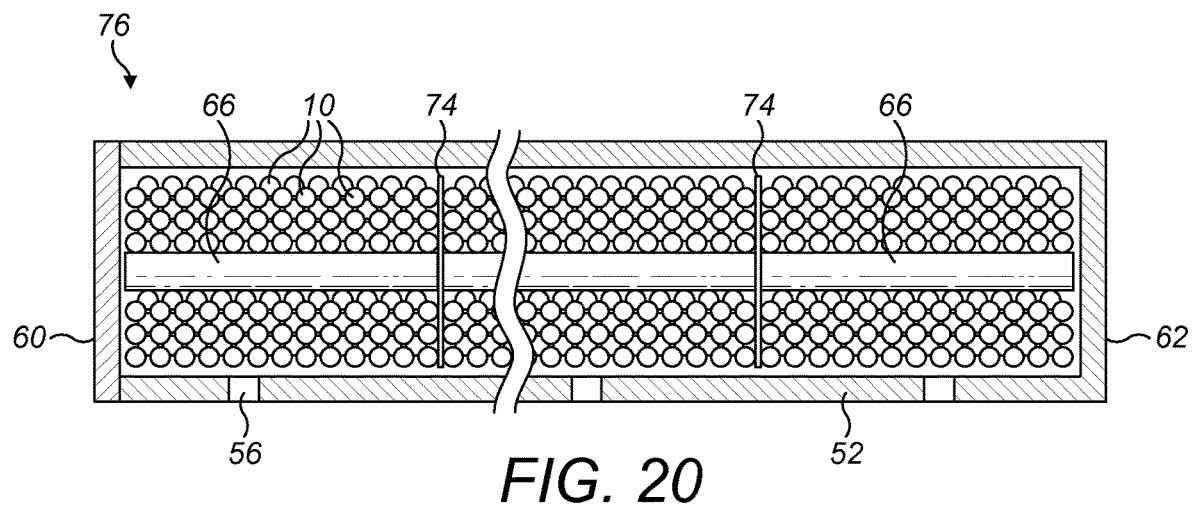

In order that the invention may be more readily understood, reference will now be made, by way of example, to the remainder of the accompanying drawings, in which:

FIG. 5 is a schematic sectional side view of a mould for use in accordance with the invention, in the process of being filled with poured macrospheres;

FIG. 6 corresponds to FIG. 5 but shows the mould now filled with macrospheres loosely packed in a primitive cubic array;

FIG. 7 corresponds to FIG. 6 but shows the mould now being vibrated to settle the macrospheres into a more densely-packed body-centred cubic array, as additional macrospheres are poured in to fill the space thus created in the mould tool;

FIG. 8 corresponds to FIG. 7 but shows the mould still being vibrated and now filled with macrospheres packed densely in a body-centred cubic array;

FIG. 9 corresponds to FIG. 8 but shows voids between and around the densely-packed macrospheres filled with a matrix formed of a liquid or a fluidised solid that has been injected or poured into the mould;

FIG. 10 corresponds to FIG. 9 but shows the matrix in the voids between and around the densely-packed macrospheres now solidified to form a solid block comprising the packed macrospheres embedded in the solid matrix, which block is being removed from the mould;

FIG. 11 is a schematic sectional side view of a storage facility for holding blocks like that shown in FIG. 10;

FIG. 12 is a schematic sectional side view of a block like those shown in FIGS. 10 and 11 placed within a close-fitting flexible envelope in accordance with the invention;

FIG. 13 corresponds to FIG. 12 but shows the densely-packed macrospheres left in the envelope after the matrix component of the block has been removed from within the envelope by liquefaction and drainage;

FIG. 14 is a schematic sectional side view of solid blocks like those shown in FIGS. 10 and 11 being inserted into a close-fitting rigid envelope in accordance with the invention;

FIG. 15 is a schematic sectional side view showing the envelope now closed around the blocks within;

FIG. 16 corresponds to FIG. 15 but shows the densely-packed macrospheres left in the envelope after the matrix component of the blocks has been removed from within the envelope by liquefaction and drainage;

FIG. 17 corresponds to FIG. 10 but shows a variant in which macrospheres have been packed around an insert in the mould to form a solid block that incorporates the insert;

FIG. 18 corresponds to FIG. 16 but shows a mass of macrospheres surrounding inserts as shown in the variant of FIG. 17, placed within a close-fitting rigid envelope;

FIG. 19 is a schematic side view of a variant of the inserts shown in FIGS. 17 and 18, modified to retain the macrospheres with a packing factor similar to that of the blocks; and FIG. 20 corresponds to FIG. 18 but shows a mass of macrospheres surrounding inserts as shown in the variant of FIG. 19, again placed within a close-fitting rigid envelope.

Referring next, then, to FIGS. 5 to 10, this sequence of drawings features a mould 20 for use in accordance with the invention. Features in common between these drawings will be described first before the drawings are discussed in turn to describe a method of the invention.

The mould 20 comprises a hollow body 22 that defines an internal mould cavity 24. The body 22 comprises a closure 26 that is movable, or removable, to allow access to the mould cavity 24 for demoulding its solidified contents as a solid block 28 after use of the mould 20, as is shown in FIG. 10.

The size and shape of the mould cavity 24 is preferably chosen to produce a block 28 that will suit the size and shape of an envelope of a buoyant element into which the block 28 will be placed, as will be explained later with reference to FIGS. 12 to 16. For example, the mould cavity 24 may be tubular with a circular section to produce a cylindrical block 28 that matches the internal size and shape of a pipe that will serve as an envelope. Alternatively the mould cavity 24 may be generally cuboidal if correspondingly-shaped blocks 28 will better suit the shape of the envelope in question.

An intake opening 30, optionally communicating with an external hopper 32, penetrates an upper wall of the body 22 to receive bulk macrospheres 10 that are poured from a source 34 into the mould cavity 24. These schematic drawings are not to scale; the macrospheres 10 shown in the drawings are greatly enlarged relative to the mould cavity 24 for ease of illustration.

A fluid inlet 36 also penetrates a wall of the body 22. As shown in FIG. 9, the fluid inlet 36 introduces a matrix material 38 into the mould cavity 24 from a reservoir 40 under the control of an inlet valve 42. The matrix material 38 is initially in a fluid form and is preferably initially in the liquid phase, such as water or a molten wax such as paraffin wax. The matrix material 38 may be poured into the mould cavity 24 under gravity and/or be injected into the mould cavity 24 under pressure.

While it remains fluid, the matrix material 38 floods and fills voids between and around the macrospheres 10 that were poured previously into the mould cavity 24. The matrix material 38 then solidifies to fix the macrospheres 10 relative to each other and to form a solid block 28 that can be removed from the mould cavity 24 as shown in FIG. 10.

In this example, transformation of the matrix material 38 from the liquid phase to the solid phase may be driven by reducing the temperature of the matrix material 38 to freeze it.

Where phase change of the matrix material 38 is driven or promoted by a change in temperature, an optional temperature-management system comprises heat-transfer elements 44 for cooling and/or heating the mould cavity 24. For this purpose, the elements 44 are in thermal contact with walls of the body 22 that surround the mould cavity 24, for example by being embedded in the walls as shown in FIGS. 5 to 10.

A vibratory apparatus acts on the mould 20 to increase the packing factor of microspheres 10 in the mould cavity 24. The vibratory apparatus is exemplified here as a shaker table 46 that supports the mould 20.

Having been discussed collectively so far, FIGS. 5 to 10 will now be discussed individually and in turn.

Figure 1:
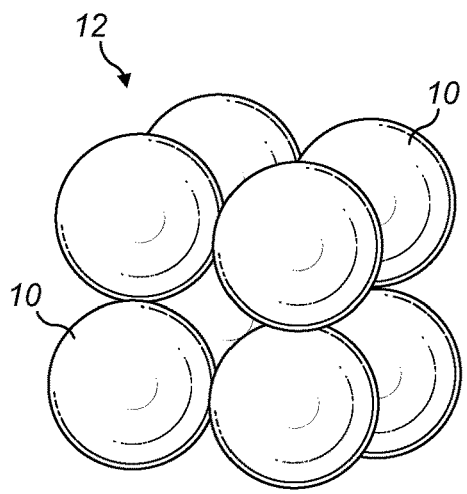
FIG. 1 is a schematic perspective view of macrospheres packed in a primitive cubic array.

For ease of illustration, FIGS. 5 and 6 represent the low packing factor of poured macrospheres 10 by, artificially, showing all of the macrospheres 10 in the mould cavity 24 packed in a primitive cubic array like that of FIG. 1. It will, of course, be appreciated that in reality there will be a random mixture of different lattice systems in the mass of macrospheres 10.

FIG. 5 shows macrospheres 10 being poured in bulk under gravity from the source 34 into the external hopper 32, from which the macrospheres 10 fall into the mould cavity 24 through the intake opening 30. As a mass of them fills the mould cavity 24, the macrospheres 10 will fall randomly into a mixture of different lattice systems. The result is that the packing factor of the mass of macrospheres 10 is initially substantially lower than desired and hence is sub-optimal.

FIG. 6 shows the mould cavity 24 now full of a poured mass of macrospheres 10. Like those of FIG. 5, the macrospheres 10 in that mass are packed with the sub-optimally low packing factor that results from pouring.

FIG. 7 shows the shaker table 46 now activated to vibrate the mould 20. This causes the macrospheres 10 in the mould cavity 24 to settle together into more stable lattice systems, hence increasing the packing factor of the mass. The overall volume of the mass of macrospheres 10 therefore decreases as shown in FIG. 7, allowing further macrospheres 10 flowing from the source 34 to fall from the hopper 32 through the intake opening 30 and into the mould cavity 24.

Eventually the mould cavity 24 is filled by a mass of macrospheres 10 as shown in FIG. 8, now packed with a higher packing factor that is considered optimal. In this respect, it should be noted that optimisation does not require that the packing factor is perfect. In practice, a shaken mass of macrospheres 10 cannot achieve an ideal packing factor but can merely approach it. Optimisation by vibration is therefore a process of improvement rather than perfection.

Figure 2:
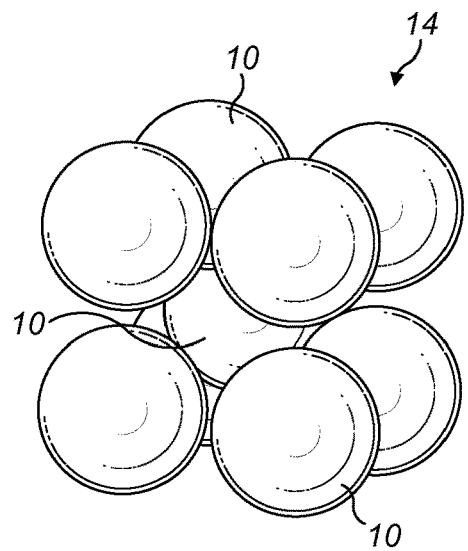
FIG. 2 is a schematic perspective view of macrospheres packed in a body-centred cubic array.
Figure 3:
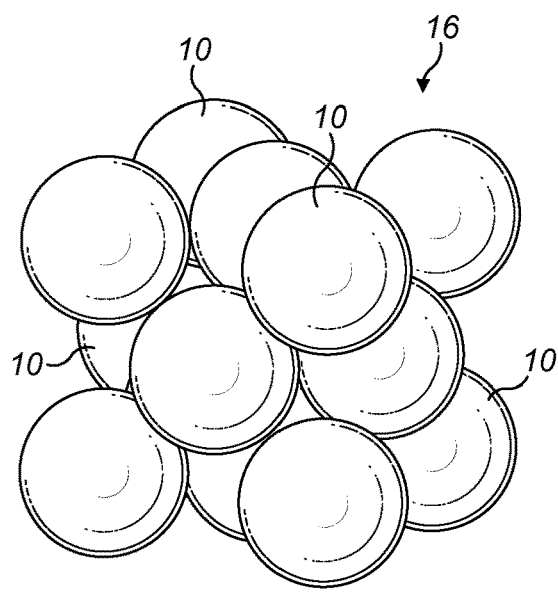
FIG. 3 is a schematic perspective view of macrospheres packed in a face-centred cubic array.
Figure 4:
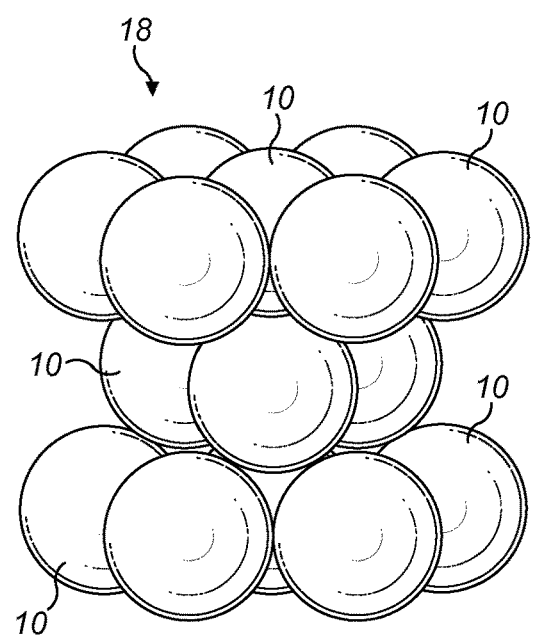
FIG. 4 is a schematic perspective view of macrospheres packed in a hexagonal close-packed array.

For ease of illustration, FIGS. 7 and 8 represent the higher packing factor of the poured macrospheres 10 by, artificially, showing all of the macrospheres 10 in the mould cavity 24 packed in a body-centred cubic array like that of FIG. 2. Again, it will be appreciated that in reality there will still be a mixture of different lattice systems in the mass of macrospheres 10. However, the overall packing factor of the mass will be higher than before the mass was vibrated, as shown in FIG. 6.

Turning next to FIG. 9, a matrix material 38, exemplified here by liquid water, is poured into the mould cavity 24 to flood and fill the voids between and around the macrospheres 10 in the mould cavity 24, which remain in the optimally-packed configuration shown in FIG. 8. When the inlet valve 42 is opened, the matrix material 38 flows from the reservoir 40 and enters the mould cavity 24 through the fluid inlet 36 that penetrates a wall of the body 22 of the mould 20.

In this example, if the matrix material 38 is liquid water, the phase of the matrix material 38 is changed from liquid to solid by lowering the temperature within the mould cavity 24 to below 0° C. This freezes the water to hold the macrospheres 10 embedded in a solid block of ice. Conveniently, the necessary reduction in temperature can be achieved by passing a refrigerant fluid through pipes embedded in walls of the body 22 that serve as the heat-transfer elements 44. The skilled reader will understand the ancillary compressor and evaporator arrangements that would be necessary to effect heat transfer in this example, which therefore need no elaboration.

If the matrix material 38 is a wax that is solid at typical ambient temperatures, the heat-transfer elements 44 could instead be heating elements to keep the wax in a flowable molten state until the voids between and around the macrospheres 10 have been flooded. Then, the heat-transfer elements 44 can be switched off to allow the wax matrix material 38 to cool and solidify as it approaches ambient temperature. Examples of heating elements are pipes for carrying hot water or steam, or electric resistance elements. Some heat-transfer elements 44 could be switchable to a cooling mode to accelerate or control cooling and solidification of the wax, for example pipes that can carry both hot and cold water.

FIG. 10 shows the closure 26 removed from the remainder of the body 22 to allow demoulding of the solidified contents of the mould cavity 24 as a solid block 28.

Although omitted from FIG. 10 for simplicity, the mould 20 could include a pusher such as a ram to push the block 28 out of the mould cavity 24; similarly, a puller could be used instead or additionally to pull the block 28 out of the mould cavity 24.

Once removed from the mould cavity 24, the block 28 may be stored temporarily with other blocks 28 in a storage facility 48 as shown in FIG. 11. If the block 28 comprises ice that will melt at ambient temperature, the storage facility 48 must be refrigerated and preferably insulated to maintain the integrity of the blocks 28.

Next, one or more of the blocks 28 are placed within a close-fitting submersible envelope to produce a buoyancy module in which the macrospheres 10 will be held substantially in an optimised closely-packed arrangement for use. In this respect, FIGS. 12 and 13 show a single block 28 placed into a flexible envelope 50, whereas FIGS. 14 to 16 show multiple blocks 28 placed into a rigid envelope 52 such as a pipe of polymer, composites or thin-walled steel. It would of course be possible instead to place a single block 28 into a rigid envelope 52 or to place multiple blocks 28 into a flexible envelope 50.

In FIG. 12, a buoyancy module 54 comprises a single block 28 disposed within a close-fitting flexible envelope 50 such as a bag made of a reinforced flexible polymer.

The envelope 50 is penetrated by holes 56 for drainage and for equalisation of hydrostatic pressure. The envelope 50 may be substantially inextensible to confine the mass of densely-packed macrospheres 10 of the block 28 or may contract resiliently around the macrospheres 10 to apply inward pressure to that mass.

Initially, the ice or wax forming the matrix material 38 of the block 28 is at a temperature low enough for the ice or wax to remain solid. That temperature will be below 0° C. for ice or a typical ambient temperature for wax. The temperature of the block 28 is then raised, or allowed to rise, until the block 28 reaches a melting temperature of above 0° C. for ice or typically above about 40° C. for wax. The ice or wax then melts and runs out of the envelope 50 through the holes 56. This leaves the macrospheres 10 packed densely in the envelope 50 as shown in FIG. 13.

Turning next to FIG. 14, a pipe that serves as a rigid envelope 52 is shown being loaded with multiple cylindrical blocks 28 that fit closely in series into the interior of the pipe. A ram 58 exemplifies a pusher that is arranged to push the blocks 28 successively into the envelope 52 through an open end 60, like pistons; the other end 62 of the envelope 52 may be open or may be closed as shown.

When the envelope 52 is full, both of its ends 60, 62 are closed as shown in FIG. 15 to create a buoyancy module 64. Next, the temperature of the blocks 28 is raised, or allowed to rise, until the ice or wax of the blocks 28 reaches an appropriate melting temperature. The ice or wax then melts and runs out of the envelope 52 through holes 56 that penetrate the envelope 52 for drainage and for equalisation of hydrostatic pressure. This leaves the macrospheres 10 packed densely in the envelope 52 of the buoyancy module 64, as shown in FIG. 16.

The holes 56 that penetrate the envelope 52 are shown oversized in the drawings for ease of illustration. In reality, the holes 56 should of course be smaller than the macrospheres 10 to stop the macrospheres 10 spilling out of the envelope 52.

Moving on now to FIGS. 17 and 18, these show how macrospheres 10 may be packed around or beside an insert 66 to form a solid block 68 that incorporates the insert 66. The insert 66 may be hollow, such as a polymer tube, or solid, such as a rod or other body of syntactic foam. The insert 66 may, for example, be elongate and may extend along a central longitudinal axis of the block 68 as shown. In this example, an elongate insert 66 is embedded in the block 68 by being surrounded with an annular mass of macrospheres 10.

The insert 66 reduces the number of macrospheres 10 that are required to form the block 68, hence reducing the loss of macrospheres 10 if a surrounding envelope 50, 52 is breached and a spillage results. The insert 66 also helps to maintain a favourable packing factor when the matrix material 38 of the block 68 has been liquefied and drained out of the envelope 50, 52. For this purpose, the insert 66 may be shaped or textured to engage or retain the adjoining macrospheres 10.

As in the preceding embodiment, the packing factor of the macrospheres 10 shown in FIGS. 17 and 18 has been optimised by vibrating the mould 20 after pouring the macrospheres 10 into the mould cavity 24 around the insert 66. Also, as before, the optimised packing factor has been fixed by solidifying a liquid matrix material 38 such as water or molten wax around and between the macrospheres 10 to form the block 68, as shown in FIG. 17.

The block 68 is then ready for storage or for insertion into a surrounding envelope 50, 52. In this respect, FIG. 18 shows a buoyancy module 70 containing a mass of optimally-packed macrospheres 10 surrounding a series of inserts 66 within a pipe that serves as a rigid envelope 52. The inserts 66 and the surrounding macrospheres 10 shown in FIG. 18 were part of multiple blocks 68 previously inserted into the envelope 52. The matrix material 38 of the blocks 68 was then liquefied and drained out of the envelope 52 through the holes 56 to leave the inserts 66 and the macrospheres 10 behind.

Turning finally to FIGS. 19 and 20, these drawings show the possibility of equipping a block 72 of macrospheres 10 with one or more restraints or barriers 74 that hold the macrospheres 10 together in a densely-packed arrangement. In this example, the barriers 74 are end plates at respective ends of the block 72, supported by respective ends of the insert 66. However, it would be possible instead to support such barriers 74 using other joining members as spacers, whether or not an insert 66 is present.

When a series of blocks 72 equipped with barriers 74 are inserted into an envelope 52 to make a buoyancy module 76 as shown in FIG. 20, the barriers 74 create a series of longitudinally-spaced transverse partitions that define smaller packed compartments within the envelope 52. This is useful in the case of very long envelopes 52, such as pipes that could be several kilometres long. In such applications, the matrix 38 of the first blocks 72 to be inserted could start to melt before the ends 60, 62 of the envelope 52 are closed to hold the macrospheres 10 within.

Thus, the partitions created by the successive barriers 74 help to ensure that most of the mass of macrospheres 10 in the envelope 52 will remain near-optimally packed, even in the case of partial failure of blocks 72 or leakage of macrospheres 10 at one end of the envelope 52. Thus, the barriers 74 cooperate with the envelope 52 to contain the macrospheres 10 but do not prevent the interior of the envelope 52 flooding with seawater when the buoyancy module 76 is in use.

A rigid outer envelope 52 could be filled with a succession of floodable inner envelopes, each containing optimally-packed macrospheres 10, either with or without a matrix 38 still fixing the macrospheres 10. If the matrix 38 has been removed, the inner envelope can fix the macrospheres 10 by constraining them in an optimally packed arrangement.

It will be apparent that end walls of such inner envelopes would serve as barriers to perform the retaining function of the barriers 74 of FIGS. 19 and 20, similarly forming a series of transverse partitions within the outer envelope 52. The inner envelopes would be shaped to fit closely within the interior of the outer envelope 52 and could be either rigid or flexible like the envelopes 50 shown in FIGS. 12 and 13.

Barriers to retain the macrospheres 10 in a block may be moulded into the block in the mould 20 or may be placed around the block after moulding.

Several variants of the invention have been described above. Many other variations are possible within the inventive concept. For example, vibration of the mould 20 may take place continuously or intermittently throughout the operation of pouring macrospheres 10 into the mould cavity 24. Vibration of the mould 20 may continue until the mould cavity 24 is full of macrospheres 10, while the matrix material 38 is being introduced into the mould cavity 24 and even after the matrix material 38 has filled the mould cavity 24. Similarly, steps to solidify the matrix material 38, such as heat transfer to effect cooling, could be initiated while the mould cavity 24 is still being filled. However, to avoid displacing optimally-packed macrospheres 10, it is preferred that vibration of the mould 20 to optimise the packing factor is completed before introducing the matrix material 38 into the mould cavity 24.

The matrix material 38 could initially be another flowable fluid material such as a gel, a paste or a suspension, or a fluidised solid such as a blown powder. Other than freezing the matrix material 38 by reducing its temperature, transformation of the matrix material 38 from the liquid phase to the solid phase may be driven by other processes depending upon the nature of the material. Such processes may include baking or sintering the matrix material 38 by the application of heat and/or pressure, or curing or otherwise setting the matrix material 38. Heat-transfer elements 44 arranged to heat the mould cavity 24 may be used to promote solidification in any manner appropriate to the matrix material 38 that is chosen.

Subsequent liquefaction of the solidified matrix material 38 can also be achieved in various ways other than melting, including disintegration or dissolution in a solvent such as water, or by chemical attack. For example, the matrix material 38 could be a solid that dissolves in seawater, such as common salt.

In many applications of the invention, it is preferred that the macrospheres 10 are not bound or attached together within the surrounding envelope 50, 52. This allows macrospheres 10 to be removed from the envelope 50, 52 if it is ever necessary to adjust buoyancy. In other applications of the invention, however, removal of macrospheres 10 may not be necessary. In that case, it is not essential for the matrix material 38 to be removed entirely or even partially from between and around the macrospheres 10 before a buoyancy module 54, 60 of the invention is used.

By fixing the macrospheres 10 in an optimally-packed arrangement, the invention maximises the buoyant upthrust of the buoyancy module 54, 60 such that any reduction in buoyancy due to degradation of the matrix material 38 is less significant. Thus, in principle, the matrix material 38 could be a polymer like those used in syntactic foams. However, it is preferred to avoid the use of such costly and dense polymers so as to reduce the cost and to improve the buoyancy of the buoyancy module 54, 60.

The macrospheres 10 need not be fixed in a fully embedding solid matrix material 38 but could instead adhere to adjoining, contacting macrospheres 10 to become fixed into a solid but porous mass. In such examples, a matrix material interposed between the macrospheres 10 at their points of mutual contact will form a discontinuous matrix containing floodable voids.

For example, macrospheres 10 could be coated with an adhesive layer that does not hinder the flow of macrospheres 10 into or within the mould cavity 24 and that is activated only after the packing factor has been optimised by vibration. Activation of such an adhesive layer could, for example, be achieved by heating, cooling, pressure and/or exposure to water or other activating fluids. After fixing the optimally-packed macrospheres 10 for transfer into an envelope 50, 52, the adhesive could be soluble in seawater to free the macrospheres 10 within a buoyancy module 54, 60 when the module 54, 60 is submerged and flooded in use.

It is also possible for the macrospheres 10 to be moistened with, or otherwise coated by, a thin layer of water or other liquid such as a molten wax. Again, such a liquid layer would not hinder the flow of macrospheres 10 into or within the mould cavity 24.

However, such a layer will effect adhesion between adjoining macrospheres 10 when it is solidified into ice or solid wax by cooling.

Depending upon the matrix material 38, the macrospheres 10 may be heated or cooled before and/or during their residence in the mould cavity 24. For example, pre-cooling macrospheres 10 to below the freezing temperature of the matrix material 38 may be helpful to promote solidification of the matrix material 38 when it is injected subsequently into the mould cavity 24. Where the matrix material 38 is ice, ice may form on pre-cooled macrospheres 10 to hold them together on introduction of water into the mould cavity 24 in liquid or vapour form, noting that water vapour will condense on cold surfaces.

Pre-heating macrospheres 10 to above the freezing temperature of the matrix material 38 may be helpful to delay solidification of the matrix material 38 when it is injected subsequently into the mould cavity 24, especially if the matrix material 38 is a hydrocarbon such as a wax.

The invention claimed is:

1. A method of filling a chamber with buoyant spheres, comprising:
    placing a mass of the spheres into a mould cavity;
    in the mould cavity, optimizing packing of the spheres to form an optimally-packed mass and then fixing the spheres in the optimally-packed mass to form a block;
    transferring the block from the mould cavity into the chamber while the spheres of the block remain fixed in the optimally-packed mass; and
    flooding the chamber in use to surround the spheres with water.

2. The method of claim 1, comprising fixing the spheres by holding together the spheres with a matrix material in the mould cavity.

3. The method of claim 2, comprising embedding the spheres in the matrix material.

4. The method of claim 2, comprising introducing the matrix material into the mould cavity in a liquid phase and then transforming the matrix material in the mould cavity into a solid phase.

5. The method of claim 4, comprising freezing the matrix material.

6. The method of claim 2, comprising optimizing packing of the spheres before introducing the matrix material into the mould cavity.

7. The method of claim 1, comprising optimizing packing of the spheres at a first temperature and fixing the spheres at a second temperature lower than the first temperature.

8. The method of claim 1, comprising substantially filling the chamber with one of more of the blocks.

9. The method of claim 1, comprising storing the block before placing the block into the chamber.

10. The method of claim 1, comprising unfixing the spheres of the block after placing the block in the chamber.

11. The method of claim 10, comprising removing a matrix material of the block from the chamber.

12. The method of claim 11, comprising liquefying the matrix material and draining the liquefied matrix material from the chamber.

13. The method of claim 10, comprising constraining the unfixed spheres to maintain substantially optimal packing of the spheres in the chamber.

14. The method of claim 13, comprising constraining the unfixed spheres with at least one barrier placed in or against the block.

15. The method of claim 1, wherein the chamber is defined by a flexible envelope.

16. The method of claim 1, wherein the chamber is defined by a rigid envelope.

17. The method of claim 1, wherein the mould cavity is shaped to match the chamber.

18. The method of claim 17, wherein the mould cavity is tubular to produce a cylindrical block and the chamber is defined by the interior of a pipe into which one or more of the blocks are inserted longitudinally through an open end.

19. The method of claim 1, comprising packing the spheres around or beside an insert in the mould cavity.

20. The method of claim 19, comprising constraining the spheres with at least one barrier supported by the insert.

21. The method of claim 1, wherein the spheres are macrospheres with an external diameter of at least 5 mm.

22. A buoyant element comprising a rigid envelope defined by a pipe, the envelope defining an internal chamber that contains a mass of buoyant macrospheres each with an external diameter of at least 5 mm, packed with a packing factor of at least 50%, and further comprising at least one barrier that subdivides the chamber and that constrains movement of the macrospheres within the chamber, the buoyant element comprising voids between the macrospheres in the mass, in fluid communication with one or more openings that penetrate the envelope.

23. The buoyant element of claim 22, wherein the macrospheres are substantially homogeneous in size through the mass.

24. The buoyant element of claim 22, wherein the macrospheres are packed around or beside at least one insert.

25. The buoyant element of claim 24, wherein at least one insert supports at least one barrier that subdivides the chamber and that constrains movement of the macrospheres within the chamber.

* * * * *